United States Patent [19]

Krippl et al.

[11] Patent Number: 4,846,099
[45] Date of Patent: Jul. 11, 1989

[54] APPARATUS FOR APPLYING A FOAM-FORMING FLOWABLE REACTION MIXTURE TO A SUBSTRATE

[75] Inventors: Kurt Krippl, Monheim; Karl D. Kreuer; Erwin Hoffmann, both of Leverkusen, all of Fed. Rep. of Germany

[73] Assignee: Bayer Aktiengesellschaft, Leverkusen, Fed. Rep. of Germany

[21] Appl. No.: 156,775

[22] Filed: Feb. 16, 1988

[30] Foreign Application Priority Data

Feb. 20, 1987 [DE] Fed. Rep. of Germany ....... 3705411

[51] Int. Cl.⁴ ................................................ B05B 3/14
[52] U.S. Cl. .................................. 118/323; 239/102.1
[58] Field of Search ......................... 239/102; 118/323

[56] References Cited

U.S. PATENT DOCUMENTS

3,009,209 11/1961 Weinbrenner et al. ......... 118/323 X
3,877,643 4/1975 Smith ................................ 239/102.1

FOREIGN PATENT DOCUMENTS

0039041 11/1981 European Pat. Off. .
2481615 11/1981 France .
1558122 12/1979 United Kingdom .

*Primary Examiner*—Shrive Beck
*Attorney, Agent, or Firm*—Gene Harsh

[57] ABSTRACT

The present invention is directed to an apparatus for applying a foam-forming flowable reaction mixture onto a substrate comprising an applicator tube connected to a mixer, said tube being provided with outlet openings and extending transversely over the substrate, further characterized in that the applicator tube is connected to a vibrating means.

9 Claims, 1 Drawing Sheet

APPARATUS FOR APPLYING A FOAM-FORMING FLOWABLE REACTION MIXTURE TO A SUBSTRATE

BACKGROUND OF THE INVENTION

The present invention relates to an apparatus for applying a foam-forming flowable reaction mixture to a substrate. The apparatus comprises an applicator tube which is connected to a mixer. The tube is provided with outlet openings and extends transversely over the substrate.

Apparatus of this type are used during the continuous production of laminated foam products and during the continuous production of polyurethane block foam on installations of this type. A continuous surface (e.g., a conveyor) with a surface layer placed on it, usually a sheet of paper, is passed beneath the applicator tube. The apparatus is also used during the discontinuous production of foam panels in a box and during the discontinuous production of block foam in a chest. The substrate rests in the form of an oblong box or an oblong chest while the applicator tube is passed over it. It goes without saying that the box or the chest can also be lined with a sheet.

The use of such an applicator tube is limited to small working widths because such an undesirable flow profile is formed with longer tubes that the substantially non-flow interface region on the internal wall increases in thickness towards the ends of the applicator tube. Due to the increased residence time in this region, the reaction mixture reacts fully before leaving the applicator tube, and cakes on and clogs up the applicator tube in the course of time. This leads to a rise in pressure in the applicator tube and the formation of larger cells which have a negative effect on the thermal conductivity of the finished polyurethane foam. During production of foam webs, i.e. polyurethane foam webs, it has proven advantageous, for this reason, and due to the requirement for a film of reaction mixture which as far as possible, is uniformly thick over the working width, to apply the foam mixture via a mixer head which oscillates over the working width. The applicator tube is oriented in the delivery direction of the product to be produced. The zig-zag application must be distributed and spread equally on the substrate. The outlay for the oscillation of the mixer head and optionally the spreading out of the layer applied is considerable. For working widths exceeding one meter it becomes more difficult to produce uniformly thick film with rapidly reacting chemical systems and/or high production rates.

With block foam installations in which the applied layer of reaction mixture is a few centimeters, the distribution of the reaction mixture is not quite so problematic. An applicator tube which branches into several outlets has been used for larger working widths. Nevertheless, there is a risk that the various streams will create transition zones in the cross-section of the foam block produced in those central regions in which they converge. The transition zones have a pore size or density which differs from that in other regions.

The object of the present invention is therefore to improve the apparatus of the type mentioned in such a way that it cannot clog as the result of reacting reaction mixture during operation and so that a uniform application is ensured for achieving a perfect end product, even with greater working widths.

BRIEF DESCRIPTION OF THE DRAWING

The FIGURE shows a section of the device of the present invention in the charging zone.

DESCRIPTION OF THE INVENTION

Figure 1:
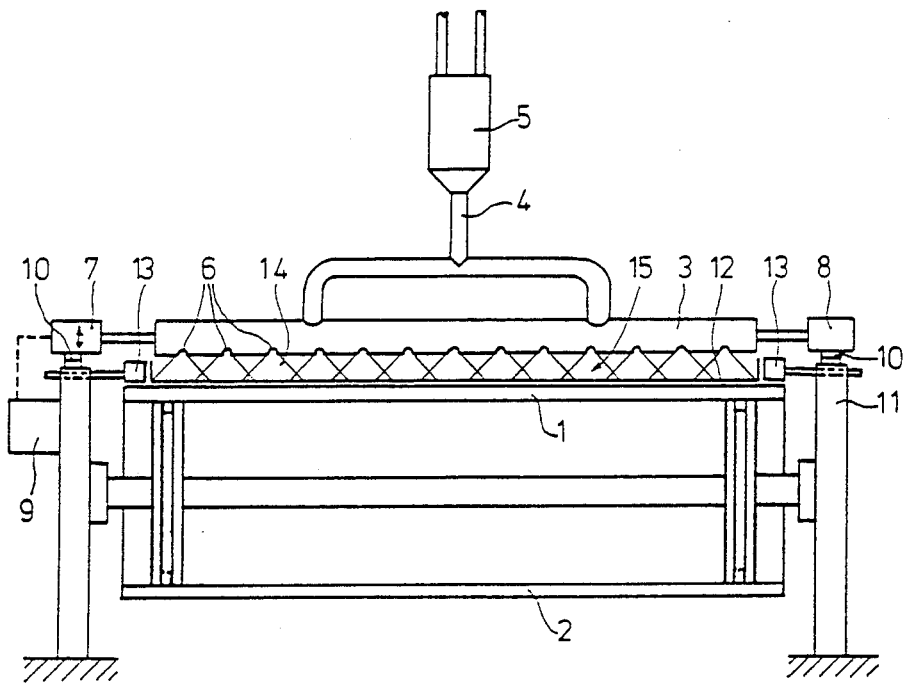

The above object is achieved by connecting the applicator tube to a vibrating means. This ensures that the interface present at the wall in the applicator tube is not poor in flow or even flowless, as in the past, but is continuously moved by the vibration. Even if it has prolonged residence times in this interface, the reaction mixture no longer has the opportunity to cake. However, the mass transfer transversely to the flow direction is also promoted by the continuous movement of the interface so that the residence time is reduced, i.e. the vibration process initiates a more desirable flow profile. As a surprising and particularly advantageous side effect, it has been found that gas dissolved in the reaction mixture issues almost completely in the form of small bubbles due to the vibrations. Since these small bubbles serve as nucleating seeds at the beginning of the foaming reaction, a finer cell structure with improved thermal conductivity is formed. The vibration also prevents or reduces the tendency of a jet issuing from an opening to constrict.

The frequency of vibration and/or the oscillation amplitude of the vibrating means are preferably adjustable. It is thus possible to adapt to the frequency of vibration and/or the oscillation amplitude to the respective requirements. Adaptation may be necessary if a reaction mixture of a different viscosity is to be processed or if the working width changes. For example, operation in the resonant range can trigger or reinforce particular effects.

According to one particular embodiment, the oscillating direction of the vibrating means coincides with the axial direction of the applicator tube.

According to another embodiment, the oscillating direction is provided perpendicularly or transversely to the applicator tube.

It is particularly advantageous to provide at least two superimposed oscillating directions.

Finally, it may be advantageous to superimpose two frequencies on one another. It is particularly advantageous to superimpose a frequency in the range of from 10 to 100 Hz on a frequency in the range of from 10 to 500 Hz. The higher frequency serves to move the interface in order to avoid caking whereas the lower frequency has the object of fanning out the jets issuing from the outlet openings. It is advantageous if fan formation takes place parallel to the applicator tube and the lower frequency is consequently applied in the axial direction of the applicator tube. If the frequency to be applied is based on the distance between the outlet openings, then it is possible to design the fans sufficiently wide to form a closed curtain at the moment when the reaction mixture strikes the substrate. As the fans formed have an approximately rhombic cross section, it is possible to arrange a substantially uniformly thick "curtain" of reaction mixture over the substrate by overlapping the fans over the working width in a suitable manner.

To allow alteration of the working width, it is advantageous to design the applicator tube variable in length either by means of telescopic guidance or by means of exchangeable end pieces of differing length.

An embodiment of the new apparatus is shown in the drawing and will be described when producing a laminated product. The FIGURE shows a section through the charging region of the laminator.

An applicator tube 3 which is connected via a branching outlet tube 4 to a mix head 5 is arranged transversely above the inlet region over the surface of the lower belt 2 of a laminator for the production of foam webs laminated with paper surface layers. On its lowest convex surface line, the tube has outlet openings 6. The tube is arranged so as to oscillate by connecting one end to a vibrator 7 and the other end to an abutment 8. A frequency controller 9 is connected to the vibrator 7. The vibrator 7 and abutment 8 are fixed on the frame 11 by means of an oscillation-insulating bearing 10. A paper web 12 is carried on the surface 1 and is folded up and supported at the sides by side strips 13. The reaction mixture issuing from the outlet openings 6 is charged onto this paper web. The guidance frequency is adapted to the distance between the outlet openings 6 such that the issuing reaction mixture forms fans 14 which overlap one another so that a closed curtain 15 is formed immediately before it strikes the paper web 12.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for applying a foam-forming flowable reaction mixture onto a substrate comprising an applicator tube connected to a mixer, said tube being provided with outlet openings and extending transversely over the substrate, further characterized in that the applicator tube is connected to a vibrating means to vibrate said tube sufficiently to reduce the tendency of jets issuing from said openings to constrict.

2. An apparatus according to claim 1, characterized in that the frequency of vibration of the vibrating means is adjustable.

3. An apparatus according to claim 1, characterized in that the oscillating amplitude of the vibrating means is adjustable.

4. An apparatus according to claim 1, characterized in that the direction of oscillation by the vibrator coincides with the axial direction of the applicator tube.

5. An apparatus according to claim 1, characterized in that the direction of oscillation is provided perpendicularly to the applicator tube.

6. An apparatus according to claim 1, characterized in that the direction of oscillation is provided transversely to the applicator tube.

7. An apparatus according to claim 1, characterized in that at least two superimposed directions of oscillation are provided.

8. An apparatus according to claim 1, characterized in that two frequencies of vibration are superimposed on one another.

9. An apparatus according to claim 8, characterized in that a frequency in the range of from 10 to 100 Hz is superimposed on a frequency in the range of from 10 to 500 Hz.

* * * * *